United States Patent
Roach et al.

[11] Patent Number: 6,148,979
[45] Date of Patent: Nov. 21, 2000

[54] COMPLIANT OVERRUNNING CLUTCH WITH CENTRIFUGAL THROW-OUT

[75] Inventors: Gregory M. Roach, Springville; Larry L. Howell, Orem, both of Utah

[73] Assignee: Brigham Young University, Provo, Utah

[21] Appl. No.: 09/240,529

[22] Filed: Jan. 29, 1999

Related U.S. Application Data

[60] Provisional application No. 60/073,173, Jan. 20, 1998, and provisional application No. 60/098,632, Aug. 31, 1998.

[51] Int. Cl.[7] ............................ F16D 15/00; F16D 23/00; F16D 41/06; F16D 43/00
[52] U.S. Cl. ............................ 192/45.1; 192/46; 74/575; 74/577 R; 74/577 M
[58] Field of Search ........................ 192/46, 45.1; 74/575, 74/576, 578, 577 R, 577 M

[56] References Cited

U.S. PATENT DOCUMENTS

| | | | |
|---|---|---|---|
| 3,171,283 | 3/1965 | Giometti | 74/6 |
| 3,486,597 | 12/1969 | Carlton | 192/46 |
| 3,589,486 | 6/1971 | Kelch | 192/46 |
| 3,910,557 | 10/1975 | Merriman | 254/150 R |
| 3,982,616 | 9/1976 | Bidanset | 192/104 C |
| 4,046,240 | 9/1977 | Schlagmuller et al. | 192/104 C |
| 4,125,074 | 11/1978 | Sato | 101/288 |
| 4,401,006 | 8/1983 | Sekiguchi | 84/95 R |
| 4,570,769 | 2/1986 | Isaka | 192/46 |
| 4,860,740 | 8/1989 | Kirk et al. | 128/203.15 |
| 5,000,721 | 3/1991 | Williams | 464/37 |
| 5,088,581 | 2/1992 | Duve | 192/46 |
| 5,143,189 | 9/1992 | Meier-Burkamp | 192/64 |
| 5,205,386 | 4/1993 | Goodman et al. | 192/46 |
| 5,246,094 | 9/1993 | Amry et al. | 192/46 |
| 5,257,685 | 11/1993 | Tichiaz et al. | 192/46 |
| 5,362,293 | 11/1994 | Romanauskas | 494/84 |
| 5,449,057 | 9/1995 | Frank | 192/46 |
| 5,522,489 | 6/1996 | Savkar et al. | 192/41 R |
| 5,577,586 | 11/1996 | Buckendahl | 192/45.1 |
| 5,678,668 | 10/1997 | Sink | 192/46 |
| 5,690,202 | 11/1997 | Myers | 192/46 |
| 5,853,073 | 12/1998 | Costin | 192/46 |

Primary Examiner—Rodney H. Bonck
Assistant Examiner—Tisha D. Waddell
Attorney, Agent, or Firm—Thorpe, North & Western, LLP

[57] ABSTRACT

A compliant overrunning ratchet and pawl clutch mechanism with centrifugal throwout comprising a ratchet wheel and a one-piece pawl wheel. The ratchet wheel has plurality of angled teeth disposed about its perimeter. The pawl wheel comprises a one-piece circular hub concentrically surrounding the ratchet wheel, and has a plurality of elongate compliant biasing members extending from its inside surface toward the ratchet wheel. The biasing members each terminate in a pawl configured for engaging the teeth of the ratchet wheel when the pawl wheel rotates in a first engaging direction, and for sliding over the teeth of the ratchet wheel when the pawl wheel rotates in a second overrun direction. The biasing members and clutch pawls are integrally formed as a single piece from the material of the pawl hub, and the pawls may comprise either compression or tension members. The biasing members may advantageously allow the pawls to "throw-out" or compliantly rotate away from the teeth of the ratchet due to centrifugal force when the pawl wheel rotates in the overrun direction. In one illustrative embodiment the clutch mechanism is formed as a micromechanical device by photolithography.

22 Claims, 4 Drawing Sheets

COMPLIANT OVERRUNNING CLUTCH WITH CENTRIFUGAL THROW-OUT

This application claims the benefit of U.S. Provisional Application No. 60/073,173, filed Jan. 20, 1998, and U.S. Provisional Application No. 60/098,632, filed Aug. 31, 1998.

BACKGROUND OF THE INVENTION

1. Field of the Invention

The present invention relates to overrunning ratchet and pawl clutches. More particularly, the present invention relates to a one-piece compliant overrunning ratchet and pawl clutch with a centrifugal throw-out configuration.

2. State of the Art

One-way overrunning clutches come in several forms, and are widely used in a variety of applications. The four main types include the spring clutch, the roller or ball clutch, the sprag clutch, and the ratchet and pawl clutch. Such clutches are commonly used for example in starters for engines, and in other types of machines for conversion of oscillating rotary motion to continuous rotary motion, for backstopping, indexing, or one-way operation.

Figure 1:
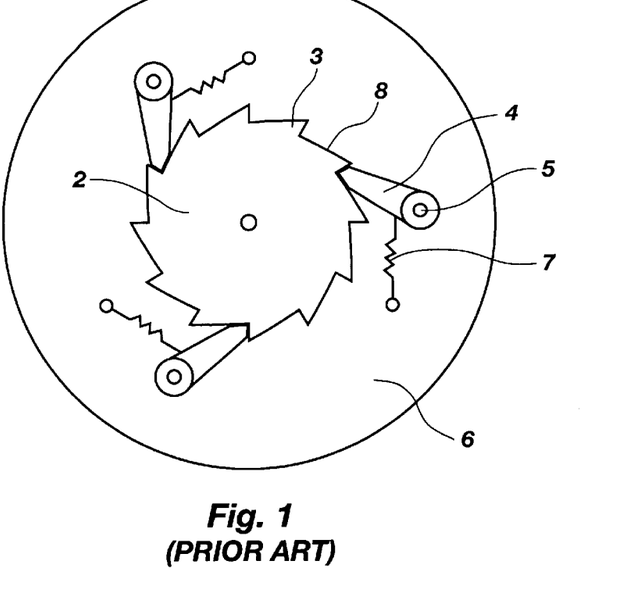
FIG. 1 is an elevation view of a typical prior art ratchet and pawl clutch.

One type of overrunning clutch of particular interest is the ratchet and pawl clutch, a simplified typical embodiment of which is shown in FIG. 1. As shown in FIG. 1, ratchet and pawl clutches typically comprise a ratchet wheel 2 with engaging teeth 3 disposed about the perimeter of the wheel, and several pawls 4 located around the perimeter of the ratchet wheel 2. The pawls 4 are rotatably connected via pins 5 to a rotatable pawl wheel 6 such that the pawls 4 may be rotated to engage the engaging teeth 3 of the ratchet wheel 2. A spring 7 is attached to each pawl to rotate the free end of the pawl into engagement with the teeth 3 of the ratchet wheel 2 when the pawl wheel rotates in the engaging or torque output direction (counter-clockwise in FIG. 1). When the pawl wheel rotates in the overrun or free-wheeling direction (clockwise in FIG. 1), the pawls 4 are forced out of engagement with the teeth by the cam surface 8 of the engaging teeth, and thus slide along the teeth without engaging.

As can be seen from FIG. 1, in their simplest form ratchet and pawl clutches typically comprise many parts. A typical overrunning ratchet and pawl clutch requires a minimum of 3 parts per pawl, including the pawl itself, the pin which provides the rotational axis of the pawl, and a spring to bias the pawl toward the engaging teeth. In addition, the pawls must be secured to a pawl wheel which is rotatably disposed about the ratchet wheel. Because of this high part count, the manufacturing cost of prior ratchet and pawl clutches has prohibited their use in many applications. The high part count also significantly increases the weight of such clutches. There is thus a need for an overrunning ratchet and pawl clutch with a smaller part count, so as to reduce the weight, complexity, and manufacturing cost of such clutches.

Overrunning ratchet and pawl clutches incorporating a single piece pawl hub or similar construction are known in the art. For example, U.S. Pat. Nos. 5,000,721 to Williams, 4,570,769 to Isaka, and 3,486,597 to Carlton each disclose a one-way ratchet or clutch mechanism comprising two principle parts. However, there are a number of operating concerns which these prior art devices do not address. First, the moving parts experience significant wear due to sliding contact between the ratchet and the pawls in the overrun mode, thus shortening the useful life of the clutch. Because of the constant friction between the parts, such clutches need constant lubrication, experience significant wear, and are also quite noisy when operated in the overrun mode.

It would therefore be desirable to have a simple overrunning ratchet and pawl clutch with a throw-out mechanism to reduce or eliminate contact between the ratchet wheel and the pawls when in the overrun mode, and thus reduce wear and noise. While clutches with throw-out mechanisms are known in the art, a one-piece ratchet and pawl clutch with centrifugal throw-out of the pawls is not known in the prior art. Furthermore, in many prior art clutches with a throw-out feature, the overrun torque, that is, the torque required to cause the pawls to rotate away from contact with the pawl wheel, is relatively large compared to the output torque that can be handled by the clutch. Thus it would be desirable to have an overrunning ratchet and pawl clutch which will have an overrun torque as close to zero as possible, so as to maximize the ratio between the output torque of the clutch and the overrun torque. This will allow the pawls to "throw-out" under centrifugal force when the pawl wheel rotates in the overrun direction at a relatively low speed.

Backlash is also a major concern with these clutches. When the pawl wheel is reversed from the free-wheeling or overrun direction to the torque output direction, the wheel will rotate some distance before the pawls engage the ratchet teeth. This rotation before engagement is termed backlash, and can impose substantial stress on the components of the clutch. Prior ratchet and pawl clutches have a significant amount of backlash, which causes higher impact loads and less predictable motion of the clutch. It would therefore be desirable to have a simple overrunning ratchet and pawl clutch mechanism which is configured to reduce the maximum possible angular rotation of the pawl wheel when switching from the overrun mode to the engagement mode, so as to reduce backlash.

It would also be desirable to have a micromechanical overrunning ratchet and pawl clutch incorporating the features described above, and being of a size on the order of 10's of microns up to 2 millimeters in overall size. Such microscopic parts must be simple enough in design that they can be fabricated by photolithography or similar techniques, and such that no assembly of the finished device is required, but are very useful in the creation of micromechanical devices.

OBJECTS AND SUMMARY OF THE INVENTION

It is therefore an object of the present invention to provide an overrunning ratchet and pawl clutch mechanism with a minimum part count, preferably comprising a one-piece pawl hub.

It is another object of the invention to provide an overrunning ratchet and pawl clutch incorporating a centrifugal throw-out design to reduce or eliminate contact between the ratchet wheel and the pawls when in the overrun mode.

It is another object of the invention to provide an overrunning ratchet and pawl clutch which has a longer useful life.

It is yet another object of the invention to provide a one-piece overrunning ratchet and pawl clutch configured to reduce backlash.

It is yet another object of the invention to provide a micromechanical one-piece overrunning ratchet and pawl clutch.

These and other objects are realized in an overrunning ratchet and pawl clutch mechanism comprising a ratchet wheel concentrically disposed within a one-piece pawl wheel formed as a compliant mechanism. More specifically, the pawl wheel, the pawls, and the device for biasing the pawls into engagement are all integrally fabricated as a single, compliant part. The pawl wheel is configured to rotate in a first engaging direction and in a second overrun direction, and further comprises a plurality of pawls and a plurality of elongate resilient biasing members which secure each pawl to the pawl wheel. The resilient biasing member biases the pawl toward the engaging position, and allows resiliently biased rotation of the pawl between an engaging position and a free-wheeling position. The ratio between the output torque of the clutch and the overrun torque (the torque required to remove the pawls from engagement) is maximized to provide a throw-out feature whereby the pawls will rotate away from the ratchet wheel due to centrifugal force when the pawl wheel rotates in the overrun direction. Advantageously, the invention maximizes the ratio of output torque to overrun torque because none of the clutch output loads are carried through the long resilient biasing member. Thus the biasing member can be less stiff, thereby reducing the overrun torque as close to zero as possible. The provision of a relatively long biasing member also reduces the magnitude of deflections and therefore of stress in this member, which results in an increased clutch life. The centrifugal throw-out configuration also reduces or eliminates sliding contact between the pawls and the ratchet teeth in the overrun mode, thereby reducing noise and part wear.

In one embodiment, the present invention provides such a clutch in which the pawls and ratchet teeth are offset such that less than all of the pawls will engage the ratchet wheel simultaneously. This configuration reduces the amount of backlash by reducing the maximum angular distance the pawl wheel must rotate when switching from the overrun mode to the engagement mode before the pawls engage the ratchet teeth. The invention may be configured with pawls which engage the ratchet teeth as compression members, or as tension members.

The invention may also advantageously be formed as a micromechanical overrunning ratchet and pawl clutch having a size on the order of from 10's of microns to 2 millimeters. The micromechanical clutch may be fabricated by means of photolithography or other similar techniques, and is useful for power transmission or mechanical actuation of micromechanical devices. Other objects and features of the present invention will be apparent to those skilled in the art, based on the following description, taken in combination with the accompanying drawings.

DETAILED DESCRIPTION OF THE PREFERRED EMBODIMENT

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

FIG. 1 provides an elevation view of a typical prior art ratchet and pawl clutch as described above. As noted, this prior art design comprises many parts which require separate fabrication and assembly, increasing the cost and weight of the mechanism. Typical prior art overrunning ratchet and pawl clutches are also noisy in operation and result in significant wear of parts due to frequent sliding contact between the ratchet and pawls.

Figure 2:
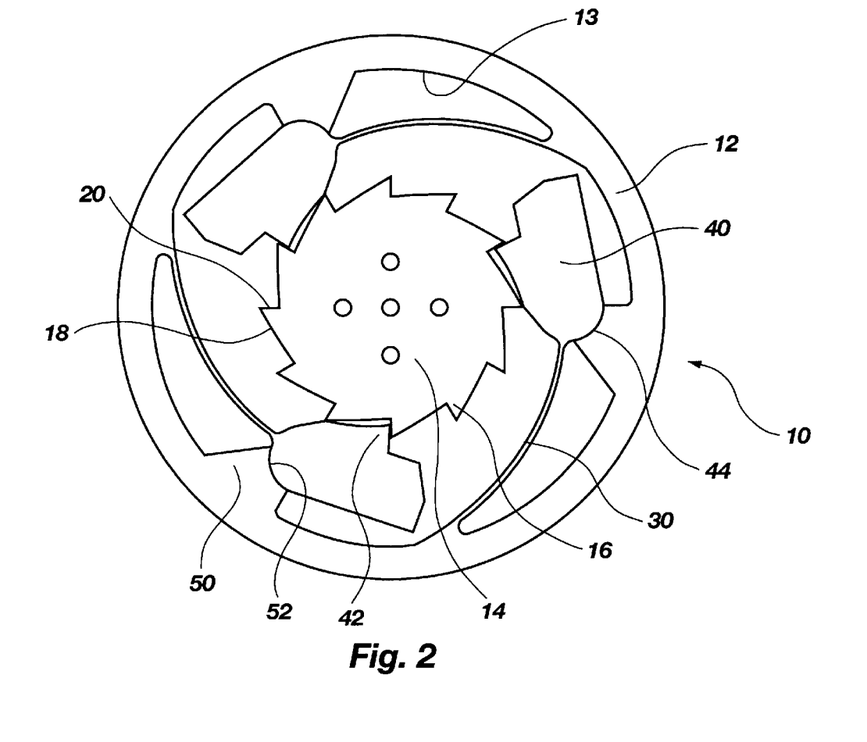
FIG. 2 is an elevation view of a preferred embodiment of the ratchet and pawl clutch of the present invention.

In a preferred embodiment of the present invention shown in FIG. 2, the ratchet and pawl clutch 10 includes a pawl wheel 12 and a ratchet wheel 14. The ratchet wheel 14 includes a plurality of angled ratchet teeth 16 disposed about its perimeter. Each ratchet tooth 16 includes an outwardly curved cam surface 18, and an opposing engaging surface 20 that preferably extends in a substantially radial direction relative to the ratchet wheel 14. The cam surface 18 and the engaging surface 20 meet in a point distal from the center of the ratchet wheel 14.

A plurality of elongate resilient biasing members 30 are each secured at a first end to the inside surface 13 of the pawl wheel 12, and, extending inwardly, are integrally connected at a second end to a pawl 40. Each pawl 40 includes an engaging tooth 42 disposed on the side adjacent to the ratchet wheel, and a support surface 44 disposed on the opposite side thereof, toward the inside surface 13 of the pawl wheel 12. In the preferred embodiment, the support surface 44 comprises a curved passive cam (seen best in FIG. 4) having a convex surface with a radius equal to or less than the radius of the support socket 52 of the support member 50 (described in more detail below). The pawl teeth 42 are adapted to engage the engaging surfaces 20 of the ratchet teeth 16 when the pawl wheel 12 rotates in the engaging direction (counter-clockwise in FIG. 2). However, the pawls 40 are configured to be pushed outwardly and slide over the extreme tips substantially clear of the ratchet teeth 16 by the cam surface 18 when the pawl wheel 12 rotates (at relatively low speeds) in the overrun direction (clockwise in FIG. 2). It will be apparent that the pawls 40 may take on a variety of shapes and sizes depending on the particular application.

In the preferred embodiment, support members 50 extend inwardly from the inside surface 13 of the pawl wheel 12 and form inner-facing support sockets 52. Each support socket 52 is adapted to cooperatively receive the passive cam 44 of a pawl 40. The passive cam 44 is seated in the socket 52 such that it may rotate freely by allowing the surface of the passive cam 44 of the pawl 40 to slide against the surface of the socket 52. Thus, the socket 52 and the passive cam 44 form a passive joint that acts as a pin joint without requiring an actual pin. Preferably, the socket 52 and the passive cam 44 remain in contact while the pawl 40 rotates. The passive joint allows the clutch 10 to withstand large output torques, compared to the torque necessary to pivot the pawl 40 out of engagement. This is because the pawl 40 is supported by the support member 50, while it is rotationally biased by the resilient arm 30.

Advantageously, the pawl wheel 12, the resilient arms 30, the pawls 40, and the support members 50 are all integrally formed from a single piece of compliant material. The one-piece pawl wheel is thus able to perform the functions that would otherwise require several parts. More specifically, each resilient arm 30 acts as a means for biasing the pawl 40 toward the ratchet teeth 16 (like the springs 7 of FIG. 1), and as a means for securing the pawl to the pawl wheel 12 (this function being performed by the pins 5 of FIG. 1). However, support member 50 acts as the means for supporting the pawl 40 when it engages a ratchet tooth 16 (this function also performed by the pins 5 of FIG. 1), to thereby transfer the torque output load from the pawl wheel to the ratchet wheel. As noted above, none of the clutch output loads are carried through the resilient biasing member, allowing that member to be very slender. This design provides several distinct benefits. It reduces the overrun torque, and also reduces the deflections and stress in the biasing member, thereby increasing the life of the clutch.

It will be apparent that when the clutch of FIG. 2 is engaged as shown, the pawls 40 act as compression members between the ratchet wheel 14 and the support member 50 of the pawl wheel 12 to transmit the rotational force of the pawl wheel to the ratchet wheel. Vectors representing these forces are shown in the free body diagram of FIG. 3, where $F_w$ represents the force imparted by the pawl wheel to the pawl via the support member 50, and $F_r$ represents the force imparted by the tooth of the ratchet wheel upon the pawl. The nature of the pawl as a compression member is clearly indicated by the fact that these force vectors point toward each other through the body of the pawl. Those skilled in the art will recognize that as a compression member, the pawl 40 will be relatively short in design in order to avoid buckling under the compressive load. The more slender the configuration of the pawls, the lower the force they will be able to withstand. At the same time, it will be apparent that the compliant biasing members 30 are designed to withstand none of the compressive forces which transmit torque from the pawl wheel to the ratchet. Instead, the biasing members need only serve to bias the pawl in an engageable relationship to the ratchet teeth 16, and to allow the pawl to rotate away from the ratchet in the passive joint when pushed by the cam surfaces 18 of the ratchet teeth, or by virtue of the centrifugal throw-out feature described in more detail below. Hence, the biasing members 30 may be of very slender design and construction.

The configuration thus described advantageously provides the overrunning clutch 10 with a centrifugal throw-out feature. When the clutch reaches a specified angular velocity, the centrifugal force on the pawls 40 overcomes the biasing force of the resilient arms 30, causing the pawls to rotate outwardly such that they no longer engage the ratchet teeth 16 or contact the cam surface 18 of any of the teeth. When the angular velocity decreases, the resilient arms 30 overcome the centrifugal force and return the pawls to their engaging position. Centrifugal throw-out clutches are desirable because they decrease the wear and noise produced by the clutch while the pawls 40 are rotated out of engagement. Centrifugal throw-out is particularly desirable in applications such as starters, where engagement is needed to produce an initial rotation, but is unnecessary thereafter.

Figure 3:
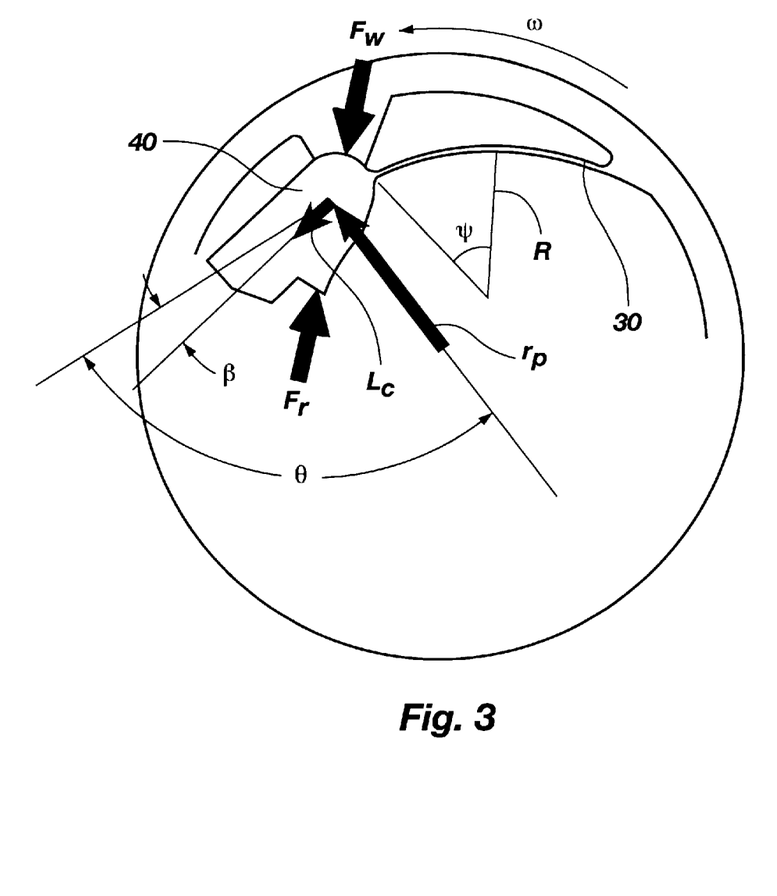
FIG. 3 is a cut-away view depicting a pawl system of the clutch of FIG. 2 and various variables considered in designing the pawl system.
Figure 4:
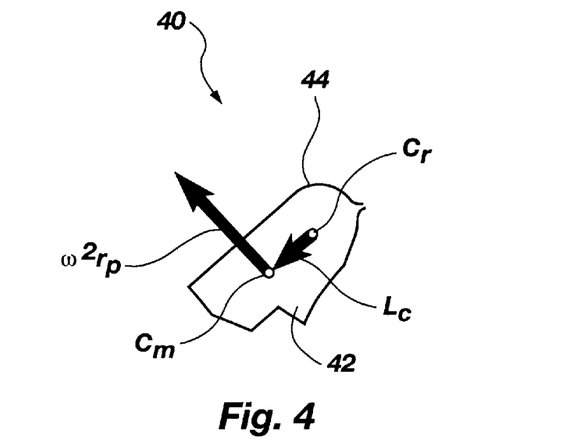
FIG. 4 is a view of the pawl from the clutch of FIG. 2, depicting further variables considered in designing the pawl system.

It is possible to calculate the angular velocity at which the pawls 40 will throw-out due to centrifugal forces by mathematically modeling the clutch 10 and solving the resulting equations. Alternatively these equations may be used to design the clutch 10 to throw-out at a specified rotational velocity. Referring now to FIGS. 3 and 4, the mathematical model assumes that the passive joint acts like a fixed pin joint, and that the deflections of the resilient arm 30 occur in the linear region. The moment on the pawl $M_0$ that is necessary for throw-out is given by the equation:

$$M_0 = \kappa\beta = \frac{\beta E I (2\psi(\sin\psi)^2 + \psi - \sin\psi\cos\psi)}{L(2\sin(\psi(\sin\psi)^2 + \psi - \sin\psi\cos\psi)) - 4\psi^2(\sin\psi)^2 R}$$

where κ is the stiffness for the resilient arm 30 and β is the angle, in radians, that the pawl 40 must rotate to clear the ratchet tooth 16, E is the modulus of elasticity of the material, I is the moment of inertia of the resilient arm 30, ψ is one half the total subtended angle, in radians, of the arc of the resilient arm 30, L is the arc length of the resilient arm 30, and R is the radius of curvature of the resilient arm 30.

The moment on the pawl 40 due to the centrifugal force is defined as $$M_0 = \omega L_c r_p m \sin\theta$$

where ω is the angular velocity, $L_c$ is the position vector from the center of rotation $C_r$ of the passive joint to the center of mass $C_m$ of the pawl 40 (seen best in FIG. 4), $r_p$ is the position vector from the center of the clutch 10 to the center of rotation of the passive joint, m is the mass of the pawl 40, and θ is the angle between $r_p$ and $L_c$ when the pawl 40 is rotated out of engagement with the ratchet teeth 16.

Through experimentation, the inventors have verified that the predicted behavior of the throw-out mechanism using the above equations is accurate to within 5% to 6%. Two prototype clutches identical to the configuration of FIG. 2 were fabricated of polypropylene using an NC milling machine. The resilient arms 30 had the following properties: L=36.6 mm (1.44 in.); R=49.8 mm (1.96 in.); ψ=0.375 rad.; h (the thickness of the compliant segment)=0.794 mm (0.03125 in.); b (the material thickness)=6.35 mm (0.25 in.); I=0.223 mm$^4$ (6.358×10−7 in.$^4$); and E=1.39 GPa (polypropylene) (200,000 psi). The pawl 40 had the following properties: m=2.222 g (4.9×10−3 lb.); $r_p$=31.2 mm (1.23 in.); $L_c$=9.09 mm (0.358 in.); and θ=1.31 rad. The required angular deflection β was 0.149 rad.

Substituting the properties of the prototype into the above equations, it was predicted that $M_0$=5.663×10$^{-3}$ Nm (0.00501 lb-in) and that the required angular velocity ω for centrifugal throw-out was 910 rpm (95.3 rad./s). Using an engine lathe and strobe light, the inventors tested the completed prototypes and found the predicted throw-out to be within 5.2% of the actually measured values. It was also found that the average peak static torque borne by the clutches before failure was 62.8 N-m (556 lb-in).

Given the demonstrated accuracy of the mathematical model, the above equations may thus be used to design clutches of various sizes, shapes and material properties. Alternatively, the necessary values for designing the clutch 10 can be determined by experimentation or other modeling methods such as finite element analysis. It will be apparent that the size and shape of the pawls may be varied so as to vary the total mass and center of mass of the pawls. Such variation will allow actuation of the throw-out mechanism at various rotational speeds as desired. As will be apparent, the shape and size of the pawls of the embodiment shown in FIG. 2 may also be modified so as to entirely prevent centrifugal throw-out of the pawls.

Figure 5:
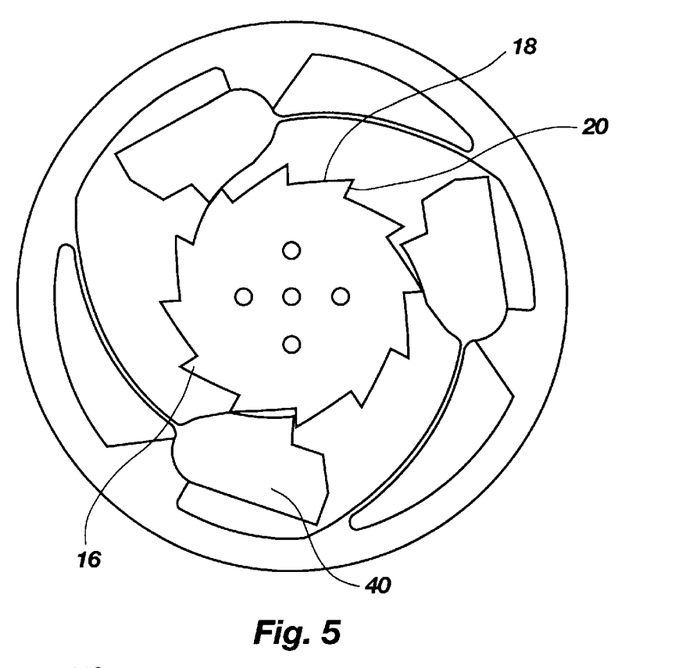
FIG. 5 is an elevation view of an alternative embodiment of the present invention wherein the pawls are offset relative to the ratchet teeth.

Backlash can be reduced in overrunning clutches by either or both of two methods. One method is to increase the number of teeth on the ratchet wheel. This will reduce the maximum angular distance the pawl wheel must rotate before engaging the teeth, thus reducing backlash. Alternatively, the pawls may be offset relative to the teeth of the ratchet wheel so that the pawl wheel may engage the teeth after rotating less than the arc length of a single tooth. Referring to FIG. 5, there is shown an embodiment of the invention designed to reduce backlash wherein the pawls 40 are angularly offset relative to the ratchet teeth in order to reduce backlash. In the embodiment of FIG. 5, wherein the pawl wheel comprises three pawls equally spaced around the wheel, it will be apparent that the backlash could never be more than ⅓ the arc length of a ratchet tooth 16. However, it will also be apparent that in this embodiment that less than all of the pawls 40 are engaged during torque output. In FIG. 5 only one of the three pawls are engaged with a tooth of the ratchet wheel. Consequently, this embodiment is desirable to reduce backlash in an application where maximizing the output torque is not crucial. However, it will be apparent that a greater number of offset pawls could be provided and configured so that more than one will engage at a given time, thus providing greater torque resistance while also reducing backlash. For example, four pawls could be offset such that two of the four will engage at any given time, and so forth.

Figure 6:
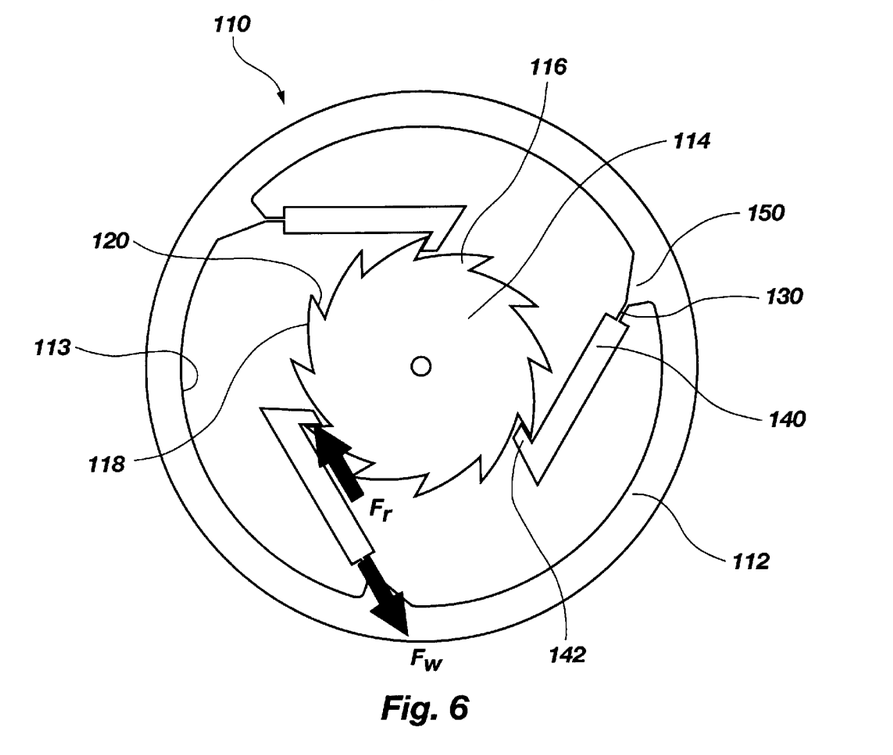
FIG. 6 is an elevation view of an embodiment of the present invention wherein the pawls are in tension during engagement.

FIG. 6 illustrates another embodiment of the present invention. In this embodiment the clutch 110 includes a pawl wheel 112 and a ratchet member 114. The ratchet member 114 is constructed similar to the that of the embodiment of FIG. 2. It includes outer facing ratchet teeth 116 having an outwardly curved cam surface 118 and an opposing spirally sloped engaging surface 120. The cam surface 118 and the engaging surface 120 come to a point distal from the center of the ratchet member 114. Support members 150 extend inwardly from the pawl wheel 112, and resilient arms 130 extend inwardly from each of the support members 150 to form small length flexural pivot joints. Pawls 140 extend inwardly from the resilient arms 130 along a line approximately tangent to the ratchet wheel. Each pawl 140 includes a pawl tooth 142.

The resilient arms 130 bias the pawls 140 toward the ratchet teeth 116. Thus, when the pawl wheel 112 rotates in the torque output direction, each pawl tooth 142 engages a corresponding engaging surface 120, placing the support member 150, the resilient arm 130, and the pawl 140 in tension. When the direction is reversed, each cam surface 118 biases the corresponding pawl tooth 142 outwardly such that each pawl tooth successively slides over the cam surface 118 of the ratchet teeth 116 without engaging. The configuration illustrated in FIG. 6 does not incorporate the centrifugal throw-out feature, except perhaps at very high speeds, because of the shape and size of the pawls 140. However, this embodiment can be easily modified to include the centrifugal throw-out feature by adding mass to the pawls, particularly near the engagement end. As in the other embodiments described above, the pawls 140 may be easily configured to have a mass and center of mass such that when rotating in the overrunning direction at a desired rotational velocity, the outward force acting on the pawl 140 overcomes the biasing force provided by the resilient arm 130, causing the pawl to rotate away from the ratchet wheel 114.

Force vectors $F_w$ and $F_r$ are provided in FIG. 6 to show the tensile forces acting on the pawls. $F_w$ represents the force imparted by the pawl wheel to the pawl via the resilient arm 130, and $F_r$ represents the force imparted upon the pawl by the tooth of the ratchet wheel. The nature of the pawl as a tension member is thus clearly shown by the fact that these force vectors point away from each other relative to the body of the pawl. Unlike the embodiment of FIG. 2, wherein the pawls 40 comprise relatively short compression members supported by support members separate from the biasing members 30, it will be apparent that the use of tension pawls in the embodiment of FIG. 6 allows the relatively slender resilient arms 130 to serve both the functions of biasing the pawl in place and transmitting the torque load from the pawl wheel 112 to the ratchet wheel 114. This dual role could not be provided in the compression pawl embodiment and still provide the centrifugal throw-out function because the required members would be too rigid.

Figure 7:
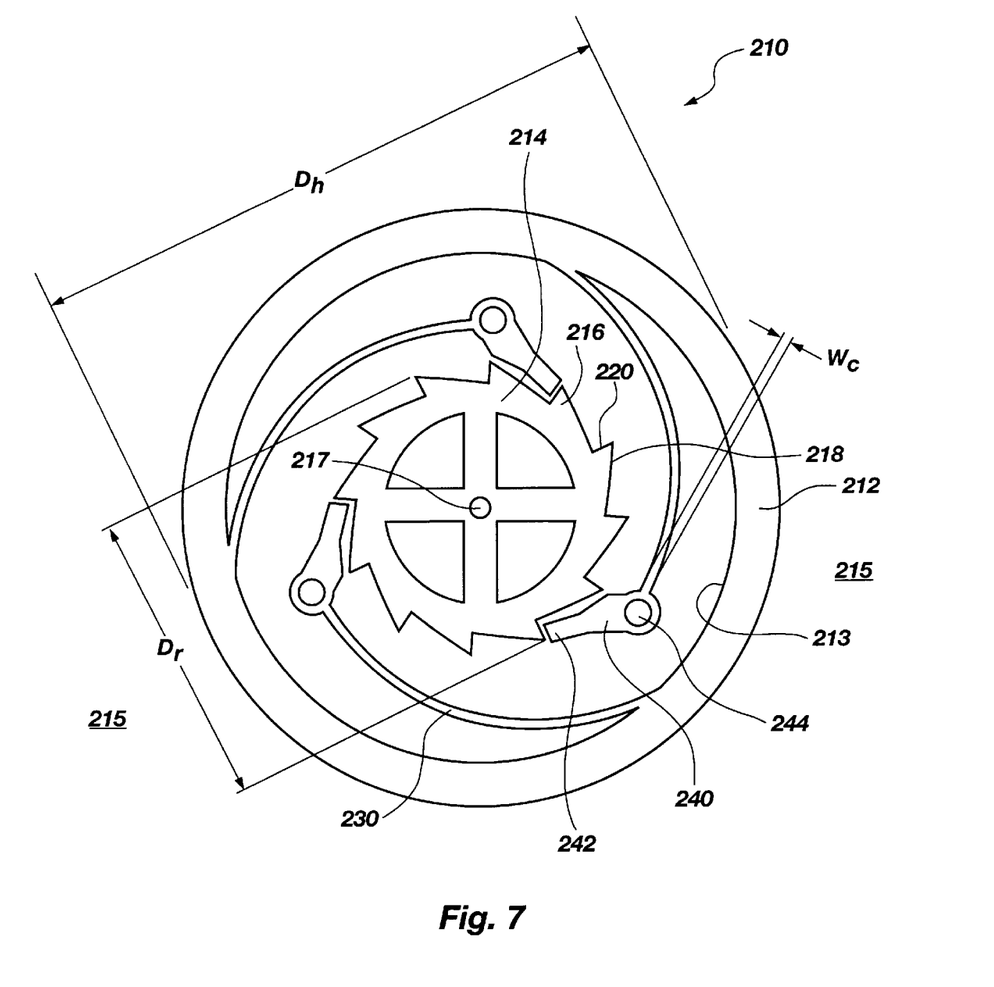
FIG. 7 is an elevation view of one embodiment of a micromechanical ratchet and pawl clutch according to the present invention.

Having a low part count and simple planar design makes the present invention particularly suitable to fabrication and use in micromechanical or microelectromechanical systems (MEMS). MEMS are devices constructed using IC-type processes at the micro level to produce mechanical and electrical components on the order of 10's of microns to 1–2 millimeters in size. FIG. 7 provides an elevation view of one embodiment of a micromechanical ratchet and pawl clutch in this size range. Like the larger embodiments, the micromechanical ratchet and pawl clutch 210 comprises a pawl wheel 212, and a ratchet wheel 214 which is rotatably attached to a substrate 215 by means of a pin 217. The ratchet wheel 214 has a plurality of angled ratchet teeth 216 disposed about its perimeter, each tooth comprising a deflecting surface 218, and an opposing engaging surface 220 that extends in a substantially radial direction relative to the ratchet wheel 214. The deflecting surface 218 and the engaging surface 220 meet in a point distal from the center of the ratchet wheel 214.

A plurality of elongate resilient biasing members 230 are each secured at a first end to the inside surface 213 of the pawl wheel 212, and, extending inwardly, are integrally connected at a second end to a pawl 240. The pawls 240 are pivotally attached to the pawl wheel via a pin 244, and have an engaging tooth 242 disposed on the side adjacent to the ratchet wheel 214. The pawl teeth 242 are adapted to engage the engaging surfaces 220 of the ratchet teeth 216 when the ratchet wheel 214 rotates in the engaging direction (counter-clockwise in FIG. 7). However, the pawls 240 are configured to rotate outwardly on the pins 244 and slide over the extreme tips of the ratchet teeth 216 when pushed by the deflecting surface 218 when the ratchet wheel 214 rotates in the overrun direction (clockwise in FIG. 7). It will be apparent that the pawls 240 may take on a variety of shapes and sizes depending on the particular application and intended throw-out characteristics. As in the other embodiments, each resilient arm 230 acts as a means for biasing the pawl 240 (like the springs 7 of FIG. 1) against the teeth 216, and as a means for securing the pawl to the pawl wheel 212 (like the pins 5 of FIG. 1). However, the support pins 244 support the pawl 240 against the torque loading when the pawl 240 engages a ratchet tooth 216.

The micromechanical ratchet and pawl clutch of FIG. 7 is preferably fabricated using photolithography processes similar to those employed for the manufacture of integrated circuits and commonly used by those skilled in the art. The basic process consists of first depositing a layer of polycrystaline silicon (polysilicon) on a substrate, and coating it with a photoresistant material to develop a pattern thereon. A suitable photoresistant material for use in this process is a product called Photoresist. Following exposure, the pattern covers the portions of the polysilicon material desired to remain, and the remainder—being waste material—is etched away. The remaining polysilicon material forms the parts of the device. A layer of oxide such as silicon dioxide is then deposited over the entire piece to provide a separation layer, and a second layer of polysilicon is deposited thereon and the process repeated.

Two prototypes of the micromechanical overrunning clutch of FIG. 7 were made following this basic procedure. The prototype clutches were fabricated with the following dimensions: Outer hub diameter, $D_h$=480 µm; ratchet wheel diameter, $D_r$=225 µm; compliant segment width, $W_c$=3.0 µm (the minimum allowable line width); and the total thickness of the clutch hub, $W_h$=1.5 µm. As constructed, the pawl wheel 212 was fixed to the substrate 215 so that the ratchet wheel could rotate while the pawl wheel remained rotatably fixed. This approach was adopted only because the fabrication equipment actually used to create the prototypes presented limitations on the number of layers which could be created. It will be apparent that available fabrication processes widely used in the art allow more layers to be created, which would have made it possible to connect the ratchet wheel and pawl wheel to separately movable mechanical components. Ideally, the pawl wheel 212 will be fixed to another member that is rotating relative to the substrate, such as an output shaft. For example, the ratchet wheel could be connected to a micro motor and the pawl wheel to an output load, or vice versa.

The finished prototypes were tested under a high powered microscope using probe tips to rotate the ratchet gear in the overrun and torque output directions. In testing, the clutch rotated freely in the overrun direction, and successfully engaged in the torque output direction. Currently, there is no way to measure the output and overrun torques of these micromechanical clutches. Nevertheless, the prototypes have shown this to be a feasible device that has possible application in mechanical actuation at the micro level.

The use of pivot pins in the embodiment of FIG. 7 may seem to increase the part count of the clutch mechanism, contrary to some of the objects of this invention. However, because this embodiment is fabricated using photolithography techniques, there is no assembly required, and the production of the additional parts only entails the deposition and etching of an additional layer. Thus the economy of manufacture and operation of the clutch are maintained in the micromechanical embodiment. However, the micromechanical compliant overrunning clutch may also be fabricated in the form of the embodiment of FIG. 2, wherein support members creating passive compression joints, rather than pivot pins are provided. The only limitation on such fabrication is the resolution of the photolithography process. It will be apparent that because the ratchet wheel and pawl wheel are fabricated in the same space on the same substrate, gaps must be formed between the parts to allow independent movement thereof. For example, there must be a gap between the support member and the pawl, and between the pawl and the ratchet wheel. However, these gaps must be as small as possible so as to allow the compliant mechanism to function properly, and the minimum gap size is a function of the resolution of the photolithography process.

It will be apparent that each of the above described embodiments of the compliant overrunning clutch could be constructed with a different number of pawls and/or ratchet teeth. It will be apparent that if increased torque output is desired, the number of pawls which concurrently engage should be increased. Increasing the number of ratchet teeth can also reduce backlash. As noted, the described embodiments may be constructed in varying sizes ranging from very large to only a few microns in diameter for use in micromechanical devices.

The clutches of the present invention are preferably constructed of materials that are sufficiently resilient to perform as compliant joints, and that are sufficiently rigid and tough to withstand the force applied to the members. Thus, the materials used will preferably have a high ratio of strength to Young's modulus. The parts are preferably constructed from polymers, since polymers can be easily manufactured and because many polymers are self-lubricating, reducing the need for separate lubricants. Polypropylene is preferred for the macro embodiments because it is inexpensive and easily manufactured, and has a high ratio of strength to Young's modulus. Alternatively, other materials, such as metals, may be used. In the micromechanical embodiments, polycrystaline silicon (polysilicon) is the preferred material for forming the micromechanical components because it is the most commonly used structural material for MEMS devices for which fabrication processes and equipment have been developed. However, other materials, such as aluminum, nickel, and PMMA (polymethyl-methacrylate) may also be used.

The methods used to manufacture the clutch may also vary. For the macro embodiments, an inexpensive method for high volume manufacturing is injection molding of polymer materials. Extrusion may also be used. Metal clutches may be manufactured using laser or water jet cutting, wire EDM, or NC milling.

From the various embodiments described above, it should be obvious to one skilled in the art that the invention may be manufactured and used in a variety of applications and that many modifications are possible in accordance with the invention. It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An overrunning ratchet and pawl clutch mechanism with centrifugal throwout, said mechanism comprising:

a ratchet wheel having a plurality of angled teeth disposed about the perimeter thereof;

a compliant, one-piece pawl wheel configured to rotate in a first engaging direction and in a second overrun direction, said pawl wheel comprising:

a circular hub concentrically surrounding said ratchet wheel and having an inner surface;

a plurality of elongate compliant biasing members having a proximal end and a distal end, said biasing members being integrally formed of the material of said hub and extending from said proximal end at the inner surface of said hub toward said distal end nearer the center of said hub;

a plurality of clutch pawls integrally formed of the material of said hub at the distal end of each of said elongate compliant biasing members, each pawl having a tooth for engaging at least one tooth of said ratchet wheel when the pawl wheel rotates in said first engaging direction, and configured to slide over the teeth of said ratchet wheel when the pawl wheel rotates in said second overrun direction, said pawls being resiliently biased in an engagable position relative to said ratchet wheel by means of said elongate biasing members, and configured to transmit the rotational force of said pawl wheel to said ratchet wheel when so engaged; and wherein said elongate compliant biasing members are configured to compliantly allow said pawls to substantially rotate away from the teeth of said ratchet wheel by means of centrifugal force when said pawl wheel rotates in said overrun direction, whereby sliding contact between the pawls and the ratchet teeth is reduced.

2. The mechanism as described in claim 1 wherein the clutch pawls comprise compression members configured to engage said hub and the teeth of said ratchet wheel to thereby transmit the rotational force of the pawl wheel to the ratchet wheel via a compressive force therebetween.

3. The mechanism of claim 2 further comprising:
a plurality of support members integrally formed on the inner surface of said hub, each support member having a bearing socket formed on the innermost surface thereof; and
wherein said pawls each comprise a body having said tooth disposed at a first end thereof, and a heel disposed at an opposite end thereof, said heel being configured for rotatable sliding contact with the bearing socket of said support member, whereby the rotational force of the pawl wheel may be mechanically transmitted to the hub through the pawl via the bearing socket of said support member.

4. The mechanism as described in claim 1 wherein the clutch pawls comprise tension members configured to engage the teeth of said ratchet wheel and transmit the rotational force of said pawl wheel from the inner surface of said hub to said ratchet wheel via tension through said pawls and said elongate compliant biasing members.

5. The mechanism as described in claim 1 wherein said pawls are disposed at angularly offset locations relative to the teeth of said ratchet wheel such that less than all of the plurality of pawls will engage said ratchet wheel simultaneously, so as to minimize backlash when the pawl wheel is switched from rotating in the overrun direction to rotating in the engaging direction.

6. The mechanism as described in claim 1 wherein said clutch is formed of a material selected from the group comprising polymers, self-lubricating polymers, and metals.

7. The mechanism as described in claim 6 wherein said clutch is formed of polypropylene.

8. An overrunning ratchet and pawl clutch mechanism comprising:
a ratchet wheel having a plurality of angled teeth disposed about the perimeter thereof;
a compliant, one-piece pawl wheel configured to rotate in a first engaging direction and in a second overrun direction, said pawl wheel comprising:
a circular hub concentrically surrounding said ratchet wheel and having an inner surface;
a plurality of elongate compliant biasing members having a proximal end and a distal end, said biasing members being integrally formed of the material of said hub and extending from said proximal end at the inner surface of said hub toward said distal end nearer the center of said hub;
a plurality of clutch pawls integrally formed of the material of said hub at the distal end of each of said elongate compliant biasing members, each pawl being resiliently biased between the inner surface of said hub and the perimeter of said ratchet wheel by means of said elongate biasing members, each pawl having a tooth for engaging at least one tooth of said ratchet wheel when the pawl wheel rotates in said first engaging direction, and configured to slide over the teeth of said ratchet wheel when the pawl wheel rotates in said second overrun direction, said pawls being configured as pure compression members, to transmit the rotational force of the pawl wheel to the ratchet wheel solely via a compressive force therebetween, with no clutch output load imposed upon the compliant biasing member.

9. The mechanism as described in claim 8 wherein said elongate biasing members and said pawls are configured to compliantly allow the engaging surface of said pawls to rotate away from the teeth of said ratchet wheel by means of centrifugal force when said pawl wheel rotates in said overrun direction, whereby sliding contact between the pawls and the ratchet teeth is reduced.

10. The mechanism of claim 8 further comprising:
a plurality of support members integrally formed on the inner surface of said hub, each support member having a bearing socket formed on the innermost surface thereof; and
wherein said pawls each comprise a body having said tooth disposed at a first end thereof, and a heel disposed at an opposite end thereof, said heel being configured for rotatable sliding contact with the bearing socket of said support member, whereby the rotational force of the pawl wheel may be mechanically transmitted to the hub through the pawl via the bearing socket of said support member.

11. The mechanism as described in claim 8 wherein said pawls are disposed at angularly offset locations relative to the teeth of said ratchet wheel such that less than all of the plurality of pawls will engage said ratchet wheel simultaneously, so as to minimize backlash when the pawl wheel is switched from rotating in the overrun direction to rotating in the engaging direction.

12. The mechanism as described in claim 8 wherein said clutch is formed of a material selected from the group comprising polymers, self-lubricating polymers, and metals.

13. The mechanism as described in claim 12 wherein said clutch is formed of polypropylene.

14. A micromechanical overrunning ratchet and pawl clutch mechanism formed upon a substrate, said mechanism having an overall diameter less than 2 millimeters and comprising:
a rotatable ratchet wheel having a plurality of angled teeth disposed about the perimeter thereof, said ratchet wheel being configured to rotate in a first engaging direction and in a second overrun direction;
a compliant pawl hub concentrically surrounding said ratchet wheel and being rotatable relative thereto, said pawl hub having an inner surface;
a plurality of elongate compliant biasing members having a proximal end and a distal end, said biasing members being integrally formed of the material of said hub and extending from said proximal end at the inner surface of said hub toward said distal end nearer the center of said hub;
a plurality of clutch pawls integrally formed of the material of said hub at the distal end of each of said elongate compliant biasing members, each pawl having a tooth for engaging at least one tooth of said ratchet wheel when it rotates in said first engaging direction, and configured not to engage the teeth of said ratchet wheel when it rotates in said second overrun direction, said pawls being resiliently biased against said ratchet wheel by means of said elongate biasing members; and
wherein said elongate biasing members and said pawls are configured to compliantly allow the teeth of said pawls to substantially rotate away from the teeth of said ratchet wheel by means of centrifugal force when said bawl hub rotates in said overrun direction, whereby sliding contact between the pawls and the ratchet teeth is reduced.

15. The mechanism as described in claim 14 wherein the clutch pawls comprise compression members configured to engage said hub and the teeth of said ratchet wheel to thereby transmit the rotational force of the ratchet wheel to the pawl hub via a compressive force there between.

16. The mechanism of claim 15 further comprising:
a plurality of support members integrally formed on the inner surface of said hub, each support member having a bearing socket formed on the innermost surface thereof; and
wherein said pawls each comprise a body having said tooth disposed at a first end thereof, and a heel disposed at an opposite end thereof, said heel being configured for rotatable sliding contact with the bearing socket of said support member, whereby the rotational force of the ratchet wheel may be mechanically transmitted through the pawl to the hub via the bearing socket of said support member.

17. The mechanism as described in claim 14 wherein the clutch pawls comprise tension members configured to engage the teeth of said ratchet wheel and transmit the rotational force of said ratchet wheel to said pawl hub via tension through said pawls and said elongate compliant biasing members.

18. The mechanism as described in claim 14 wherein said ratchet wheel is fixedly attached to said substrate and said pawl hub is rotatably attached thereto and configured to rotate in a first engaging direction and in a second overrun direction.

19. The mechanism as described in claim 14 wherein said pawl hub is fixedly attached to said substrate and said ratchet wheel is rotatably attached thereto and configured to rotate in a first engaging direction and in a second overrun direction.

20. The mechanism as described in claim 14 wherein said pawls are disposed at angularly offset locations relative to the teeth of said ratchet wheel such that less than all of the plurality of pawls will engage said ratchet wheel simultaneously, so as to minimize backlash when the pawl wheel is switched from rotating in the overrun direction to rotating in the engaging direction.

21. The mechanism as described in claim 19, wherein the pawls are rotatably connected to the substrate via pins which allow the teeth of the pawls to rotate away from the ratchet wheel.

22. An overrunning ratchet and pawl clutch mechanism comprising:
a ratchet wheel having a plurality of angled teeth disposed about the perimeter thereof;
a compliant, one-piece pawl wheel configured to rotate in a first engaging direction and in a second overrun direction, said pawl wheel comprising:
a circular hub concentrically surrounding said ratchet wheel and having an inner surface;
a plurality of elongate compliant biasing members having a proximal end and a distal end, said biasing members being integrally formed of the material of said hub and extending from said proximal end at the inner surface of said hub toward said distal end nearer the center of said hub;
a plurality of clutch pawls integrally formed of the material of said hub at the distal end of each of said elongate compliant biasing members, each pawl being resiliently biased between the inner surface of said hub and the perimeter of said ratchet wheel by means of said elongate biasing members, each pawl having a tooth for engaging at least one tooth of said ratchet wheel when the pawl wheel rotates in said first engaging direction, and configured to slide over and substantially clear the teeth of said ratchet wheel when the pawl wheel rotates in said second overrun direction; and
wherein said pawls are configured as pure tension members, to transmit the rotational force of the pawl wheel to the ratchet wheel solely via a tensile force through the pawl and the elongate compliant biasing members.

* * * * *

UNITED STATES PATENT AND TRADEMARK OFFICE
CERTIFICATE OF CORRECTION

| | | |
|---|---|---|
| PATENT NO. | : 6,148,979 | Page 1 of 1 |
| APPLICATION NO. | : 09/240529 | |
| DATED | : November 21, 2000 | |
| INVENTOR(S) | : Gregory M. Roach et al. | |

It is certified that error appears in the above-identified patent and that said Letters Patent is hereby corrected as shown below:

Column 1; line 8 Add:

GOVERNMENT RIGHTS

This invention was made with government support under Grant No. DMI 9624574 awarded by National Science Foundation. The government has certain rights in the invention.

Signed and Sealed this

Seventeenth Day of February, 2009

JOHN DOLL
*Acting Director of the United States Patent and Trademark Office*